United States Patent [19]

Lin et al.

[11] Patent Number: 5,974,525
[45] Date of Patent: *Oct. 26, 1999

[54] SYSTEM FOR ALLOWING MULTIPLE INSTRUCTIONS TO USE THE SAME LOGICAL REGISTERS BY REMAPPING THEM TO SEPARATE PHYSICAL SEGMENT REGISTERS WHEN THE FIRST IS BEING UTILIZED

[75] Inventors: Derrick Chu Lin, Foster City; Ramamohan Rao Vakkalagadda; Satchitanand Jain, both of San Jose; Varsha P. Tagare; Nimish H. Modi, both of Sunnyvale, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/985,615
[22] Filed: Dec. 5, 1997
[51] Int. Cl.$^6$ ........................................................ G06F 9/00
[52] U.S. Cl. ............................................. 712/23; 712/215
[58] Field of Search ........................ 395/800.23, 800.01; 711/114, 206; 712/23, 215

[56] References Cited

U.S. PATENT DOCUMENTS

| | | |
|---|---|---|
| 4,466,056 | 8/1984 | Kenechi ................................. 711/206 |
| 4,972,338 | 11/1990 | Crawford et al. . |
| 4,992,938 | 2/1991 | Cocke et al. ............................. 395/393 |
| 5,109,334 | 4/1992 | Setsufumi ................................ 711/206 |
| 5,446,912 | 8/1995 | Colwell et al. . |
| 5,471,633 | 11/1995 | Colwell et al. . |
| 5,499,352 | 3/1996 | Clift et al. . |
| 5,524,262 | 6/1996 | Colwell et al. . |
| 5,548,776 | 8/1996 | Colwell et al. . |
| 5,613,132 | 3/1997 | Clift et al. . |
| 5,675,759 | 10/1997 | Shebanow et al. ...................... 395/393 |
| 5,694,564 | 12/1997 | Alsup et al. ............................. 395/392 |
| 5,740,414 | 4/1998 | Tovey et al. ............................. 395/580 |

*Primary Examiner*—Meng-Ai T. An
*Assistant Examiner*—Mackly Monestime
*Attorney, Agent, or Firm*—Flakely, Sokoloff, Taylor & Zafman

[57] ABSTRACT

A technique for increasing the number of physical segment registers by renaming logical segment registers into a larger register space. The remapping of the segment registers allows for instructions accessing the segment registers to be executed non-serially. The renaming of segment registers is achieved by assigning a shadow register to a segment register name. Thus, a pair of registers are physically available for a specified logical register in an instruction set to be renamed. Two bits, designated as the PSEG and SPEC bits, are used to control the remapping.

20 Claims, 6 Drawing Sheets

SYSTEM FOR ALLOWING MULTIPLE INSTRUCTIONS TO USE THE SAME LOGICAL REGISTERS BY REMAPPING THEM TO SEPARATE PHYSICAL SEGMENT REGISTERS WHEN THE FIRST IS BEING UTILIZED

BACKGROUND OF THE INVENTION

1. Field of the Invention

The present invention relates to the field of processor architecture and, more particularly, to a technique for renaming segment registers, so that segmentation instructions which use or modify segment registers can be processed by a processor non-serially.

2. Background of the Related Art

The concepts of a processor, such as the processors utilized in the current generation of desktop and laptop computers and workstations, are known in the art. The term microprocessor has been generally attributed to these types of processors. These processors typically operate implementing one of several processor architectures known in the computer industry. One of the more well-known processor family is the x86 processor family. The x86 processor family employs a processor architecture commonly referred to as the Intel Architecture and processors manufactured by Intel Corporation implement this architecture.

A processor operates by responding to program instructions, which are written by a programmer and coded for a particular protocol. These program instructions are generally compiled, assembled, translated, decoded, etc., before being placed in a form for execution by the processor's execution unit. Thus, a processor receives a given program instruction and responds to it based on the particular processor architecture. Once a given program instruction is received and decoded by the processor, micro-operation instructions are generated by the utilization of the processor microcode. The micro-operations (known as uops) perform the necessary internal operations so that execution signals are generated for executing the program instruction by the processor's execution unit(s).

The instructions take many forms, including operations to manipulate data, as well as operating on the data. For example, load, store and move instructions manipulate data, while add and multiply instructions operate on data. In order to access and move the data, the locations of the data must be identified. The data can reside in a number of locations as well. Accordingly, an addressing scheme is utilized to address and identify the resident location of the information (which can be data, instructions or other information) being sought.

A variety of addressing schemes are known in the art and one particular addressing scheme employs the use of segments to address memory. For example, processors based on the Intel Architecture utilize segmentation. Segmentation is a technique of dividing memory into a number of partitions (segments), so that a segment addressing scheme can be used as a form of logical addressing. The processor then generates a linear address, based on the segment address provided. Segmentation is distinct from the generation of the actual physical address. Techniques for segmenting the physical memory space are known in the art and one scheme is described in U.S. Pat. No. 4,972,338.

With the Intel Architecture, a set of general purpose registers are available to the execution unit for temporary storage of information. The program instructions identify architectural registers, commonly known as registers EAX, EBX, etc., for use in the temporary storage of information when performing the instructions. When the uops are completed, the final result is available as the instruction is retired. Then, this result (which is regarded as a valid architectural or committed value) can be utilized by subsequent instruction(s). Where instructions are actually executed in a sequential order as the program order, providing a one-for-one physical register structure for each of the required architectural registers is sufficient for the proper operation of the processor.

However, current generation superscalar processors operate on more than one instruction at a time and the instruction processing cycle implements a considerably deep pipeline. Furthermore, many of these superscalar processors also perform instruction operations out of order from the program order, so that the data dependencies become critical for many of the operations.

The data dependencies can be actual (true) dependencies or false dependencies. A true dependency occurs when a sequence of register operations must occur in order. For example, one operation may move a data into a register and a second operation may add a value to a stored value in the register and then store the final sum in that same register. In this instance, order in which this sequence is executed is critical. An example of a false dependency is the case when two separate operations attempt to utilize a given register, but where the operations are not inter-related. For example, one instruction may place a first value in the architectural register ECX, while a second instruction may also place a second value into ECX. The two operations do not depend on one another, but present a conflict when both instructions are being processed simultaneously. In this instance, the order of the operation is not critical, but the dependency still exists.

The earlier processors implementing the Intel Architecture were severely constrained in the availability of general purpose registers, causing compilers to reuse these registers heavily as temporary storage spaces. The dependencies limited the efficiency of the processors to perform superscalar operations. In order to alleviate this problem and to improve the processing efficiency, a technique has been developed to increase the availability of the general purpose architectural registers. One such technique is described in U.S. Pat. No. 5,548,776. The technique of renaming integer and floating point registers allows for the logical architectural registers to be mapped into a larger physical register space. The mapping is done at the execution time and the reverse mapping is done at retirement time.

A newer generation of processors have now implemented the renaming of general purpose registers to enhance performance and efficiency. However, the newer processors did not extend the renaming technique to the segment registers that are used for memory operations. Typically, programmers view the memory space as one large unsegmented space and generally with today's processors operating at 32-bits or higher, the amount of memory space available for access is sufficiently large. For a 32-bit system, 4 G of memory space is available for addressing. Thus, programmers tend to load the segment registers once and rarely reload them. However, if the instruction requires the segment registers to be reloaded, a significant performance loss is experienced due to the constraints placed on superscalar operations.

The more recent program codes designed within the 32-bit operating system can take into account the sizable memory space available. However, processors operating on the Intel Architecture are still capable of executing earlier 16-bit codes. In 16-bit code, segment registers are reloaded much more frequently, since the available memory space in 16 bits for addressing is 64 K. The segment registers are reloaded due to this limited size and also due to the practice of using segments as pointers to execute far control transfers. Thus, the 32-bit superscalar processors are significantly constrained when executing the older 16-bit programs.

The present invention improves the superscalar efficiency of executing older instructions which require more frequent reloading of segment registers. The efficiency is improved by making available more internal segment registers and providing a scheme of renaming to map into these physical registers. The invention is applicable to instructions which use or modify segment registers.

SUMMARY OF THE INVENTION

The present invention describes a technique for increasing the number of physical segment registers by renaming logical segment registers into this larger register space. The remapping of the segment registers allows for instructions which use or modify the segment registers to be executed non-serially. The renaming of segment registers can be implemented in various processors, but the improvement in performance is significantly noticeable when running 16-bit code on the more recent 32-bit (or more) processor architecture.

The renaming of the segment registers is achieved by assigning a shadow register to a segment register name. Thus, a pair of registers are physically available for a specified logical register of an instruction set after renaming. For example, the DS register in the Intel Architecture is renamed to either DS0 or DS1. The renaming allows one of the renamed registers to contain the architectural segment value, while the other renamed register holds a speculative value. Two bits in a segment register alias table (SRAT) control which register is current and if the current register is speculative. If the current register is speculative, then the other register holds the committed (architectural) value.

The current register is identified by a PSEG bit and the speculative operation is identified by a SPEC bit in the SRAT. When instructions are initiated to use or modify a segment register, microoperations (uops) cause the PSEG and/or SPEC bits to be accessed to check the bit values. The PSEG bit identifies the current register and the SPEC bit determines if the current register is speculative. If no speculative operations are pending for the current segment register, then that register contains the architectural value. If the SPEC bit is set (identifying that the current register is used for a speculative operation), the other register contains the architectural value.

If an operation is to modify the segment register, the PSEG bit is flipped to modify the other register to access it, if no speculative operations are pending. However, if the SPEC bit is set, then both segment registers are being utilized, requiring the speculative operation to end before the modification can occur. Correspondingly, when instructions are issued to use the segment register, the PSEG bit determines which is the current register.

A reservation station (RS) maintains the state machine and schedular to ensure that data dependencies are honored until the uop for renaming the segment register has been executed. The renamed segment registers and the accompanying control logic are located in an address generation unit (AGU). Thus, by providing a mechanism to remap the segment registers of a processor architecture, speculative and out-of-order operations can be performed to improve the performance of superscalar processors.

DETAILED DESCRIPTION OF THE PRESENT INVENTION

A technique to rename segment registers so that logical segment registers can be mapped into a larger physical segment register space is described. In the following description, numerous specific details are set forth, such as a specific processor architecture, instructions, register names, bit patterns, devices, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a preferred embodiment of the present invention is described in reference to the Intel Architecture and the x86 family of processors. However, it is readily understood that the present invention can be implemented in other processor architectures as well, without departing from the spirit and scope of the present invention.

Figure 1:
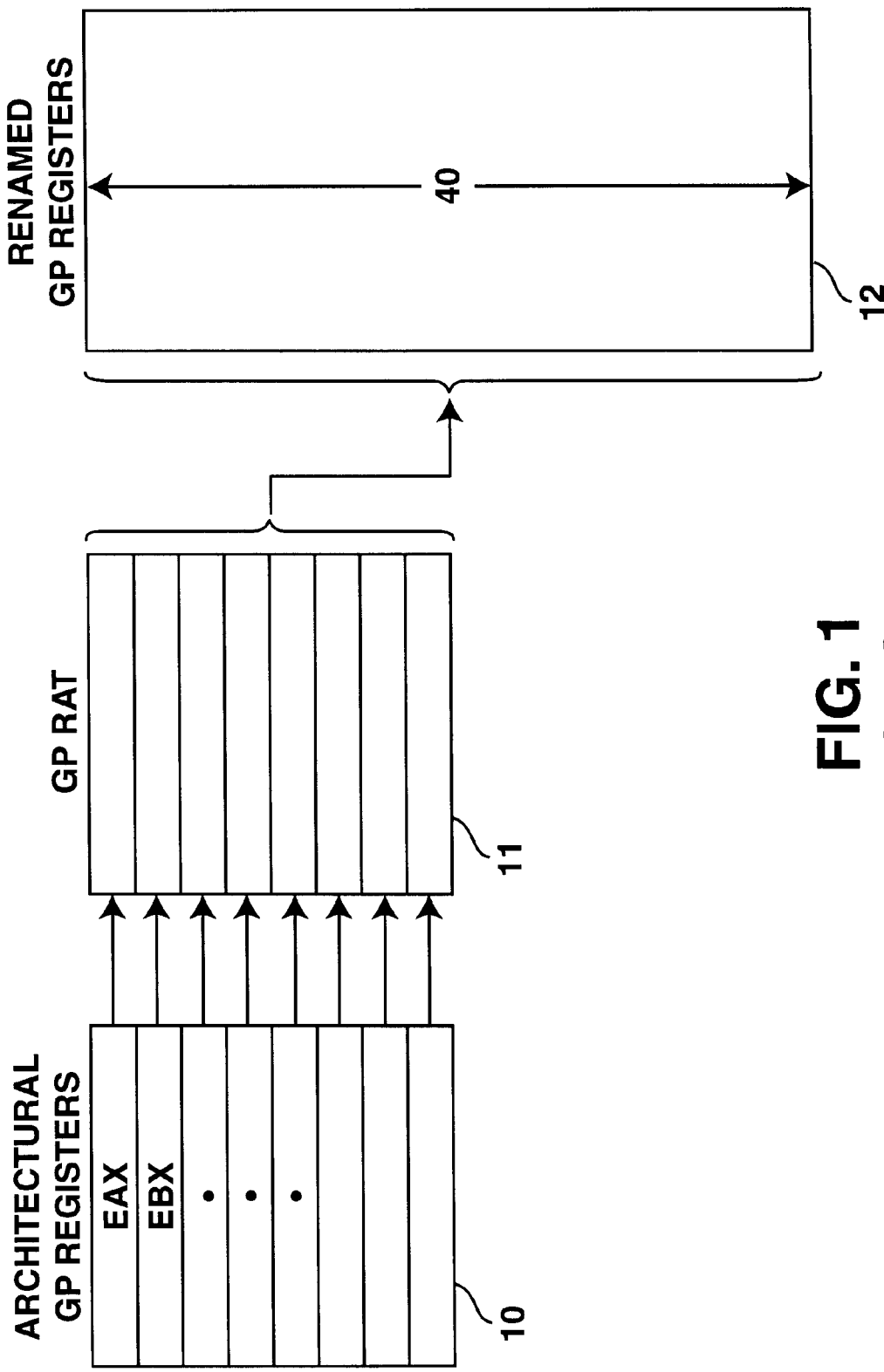
FIG. 1 shows a prior art technique of remapping a limited number of logical set of general purposes registers into a more extensive set of physical registers.

Referring to FIG. 1, a prior art scheme for renaming general purpose (GP) registers is shown. A set of general purpose architectural registers 10 is shown. Eight registers 10 are shown in FIG. 1. These registers 10 are logical registers referenced by a given instruction set, such as the instruction set for a processor operating under the Intel Architecture. For the Intel architecture, these registers 10 are generally referenced as EAX, EBX, etc. Without the renaming of GP registers 10, there would typically be a one-to-one mapping of the logical registers to actual physical registers.

However, when renaming of GP registers 10 is implemented, a register alias table (RAT) 11 is used to map the logical registers 10 to a larger physical register space, so that additional physical registers 12 are available to the execution unit of the processor for internal storage of information. In the particular example, forty such registers 12 are shown. The RAT 11 is responsible for renaming the logical register 10, when such renaming is desired.

Thus, for example, when an instruction is received to load a particular data into register EAX, the RAT 11 is consulted. Without renaming, a default mapping to one of the physical registers assigned as EAX occurs. However, if renaming is to be performed, then the RAT 11 assigns and provides the location of any one of the registers 12 and further maintains the remapped information in the RAT 11. Accordingly, with the scheme of FIG. 1, any of the GP logical registers 10 can be remapped to any of the physical registers 12, wherein the RAT 11 maintains the renaming information for subsequent output from the renamed physical register 12.

Figure 2:
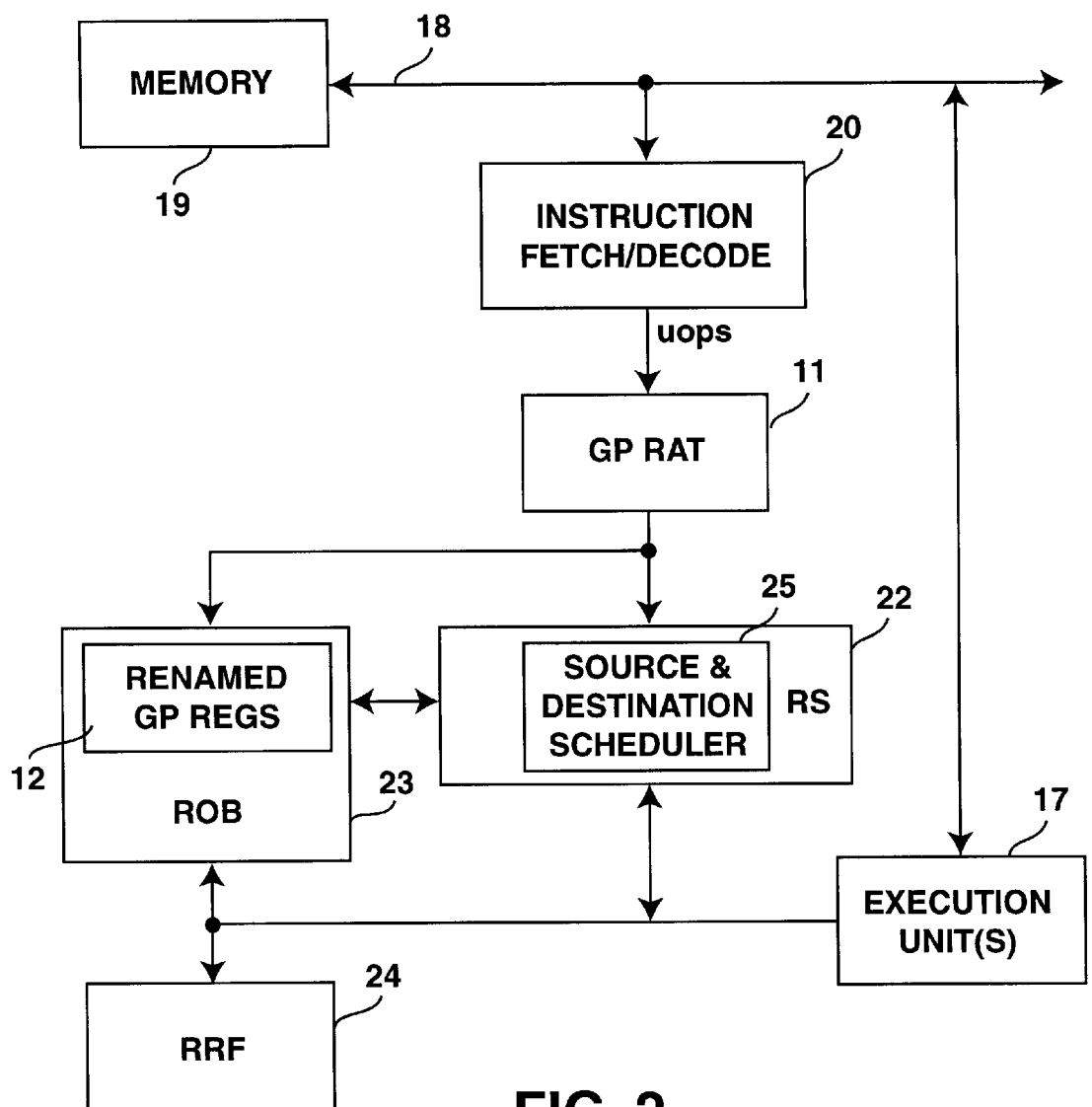
FIG. 2 shows a block diagram of a portion of a processor implementing the prior art technique of remapping the general purpose registers.

FIG. 2 exemplifies a scheme within a processor for performing this renaming of GP registers. A fetch and decode unit (hereinafter referred to as a decoder) 20 receives a program instruction and decodes it. By the use of the resident microcode, signals to perform micro operations (uops) are generated. The uops access the RAT 11. In actual practice, the GP RAT 11 is further separated into an integer RAT and a floating point RAT for respective integer and floating point operations. The physical internal registers 12 are located within a reorder buffer (ROB) unit 23.

It is appreciated that at any given moment, only one value is architectural (or true) for a given logical register. That is, the internal allocation may have allowed several temporary values for a given logical register (such as EAX) to be stored within the registers 12, but only one value is true, while the other(s) is/are speculative. Thus, speculative instructions are not permitted to update certain portions of the microprocessor that hold architecturally visible (true) values. Only the value of the latest nonspeculative instruction is regarded as the true value. The retiring of the instruction and the architecturally visible information from the ROB 23 is achieved by the real register file 24. Retirement is the act of removing a completed uop from the ROB 23.

In order to maintain tracking of the various dependencies and schedule the order of information access, a reservation station (RS) 22 is used. The RS 22 is coupled to the RAT 11 and ROB 23 and includes a scheduler 25 for scheduling the accesses as required by source and/or destination operands of the instruction. The RS 22 receives the uops with renamed sources and destinations (physical registers 12) and the schedular 25 queues the uops for an execution unit (or units)17, which is coupled to the physical registers as well.

As noted earlier, one example of renaming registers is described in the U.S. Pat. No. 5,548,776. The source and destination target registers are renamed for the uop, so that multiple instructions accessing a given register can be executed simultaneously. However, at any given time, only one value is true and the rest is/are speculative.

Furthermore, in FIG. 2, the decoder 20 and execution unit(s) 17 are shown coupled to a bus 18, which is then coupled to a memory 19. The memory 19 is shown to represent any form of information storage (including cache memory, main memory, mass storage memory or even memory storage accessible over networks and the Internet). Bus 18 is shown as a single bus for exemplary purpose only. Typically in state-of-the-art processors, multiple buses are present and execution units are not necessarily coupled directly to memory 19. However, these features are known and not critical to the understanding of the present invention.

Figure 3:
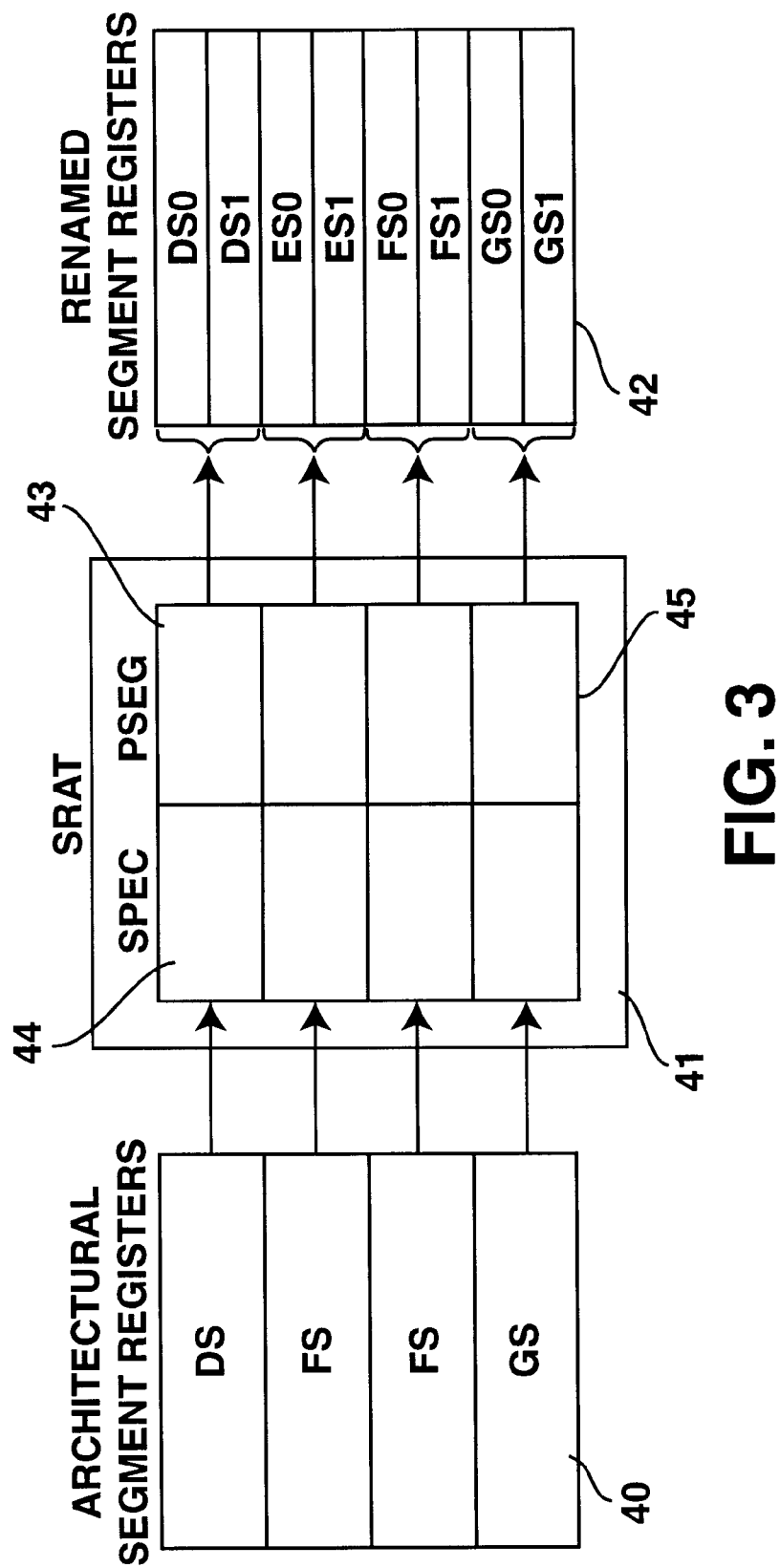
FIG. 3 shows a technique of the present invention in remapping logical segment registers to a pair of renamed physical segment registers.

FIG. 3 is a block diagram of an implementation of the present invention in which segment registers are renamed (remapped), in order to provide for additional internal segment registers. As earlier described, the use of segmentation for * addressing is known in the art. One such segmentation scheme is described in the afore-mentioned U.S. Pat. No. 4,972,338. Also, FIG. 4 shows a diagram to illustrate how segment registers are utilized to provide an address for accessing information for use in a GP register.

It is appreciated that processors based on the Intel Architecture utilize segmentation. Segmentation is utilized in both the real and protected modes of operation for the processor. In the protected mode, a segment descriptor is read to provide the segment address. A segment selector is used to read the segment descriptor. The linear address is then utilized for paging. In the real mode, a real mode segment is derived by shifting the segment selector a predefined amount and utilizing the limit and access rights already present in the segment register. In the real mode, a linear address obtained by adding the segment base to the offset provides the physical address, since there is no paging involved. The modes of operation for a processor operating on the Intel Architecture is known in the art.

Figure 4:
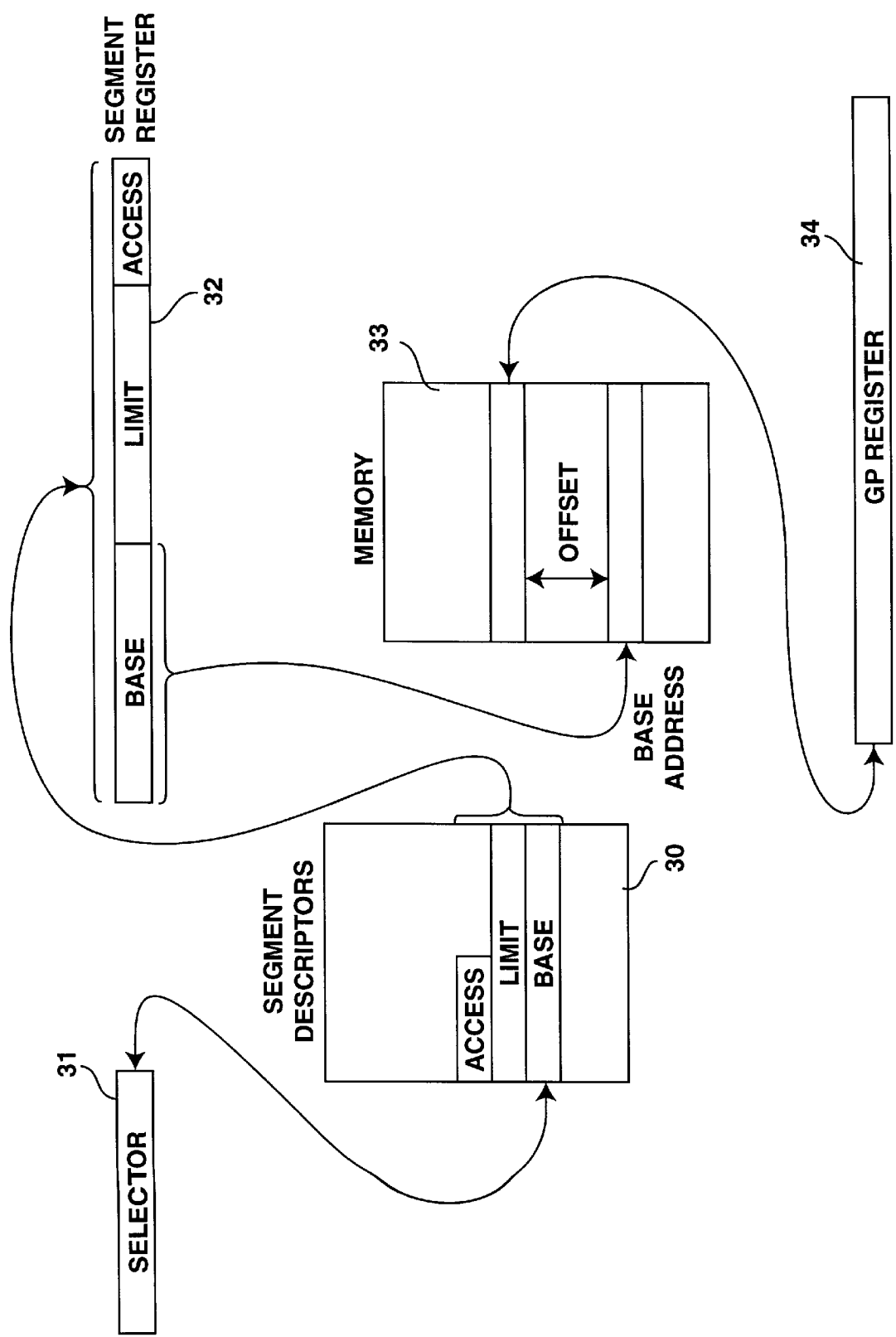
FIG. 4 shows an accessing scheme for accessing memory contents for use in general purpose registers.

Accordingly, in FIG. 4, a segment descriptor table 30 is shown in which segment descriptor values are loaded and stored. When a particular segment is required, a selector 31 (which functions similar to a program pointer) is loaded with the address of the desired segment descriptor in the descriptor table 30. The content of the selected descriptor is then loaded into a specified segment register 32. The contents of the descriptor table includes a base address, a limit address and access control for the segment. Access rights control the privilege level and the type of access permitted for corresponding segments.

Then, the base address component is combined with an address offset to provide another address for accessing a specified location in memory 33. It is to be noted that in FIG. 4, the address from the segment is shown accessing a memory location. Although this is one method, other methods use the information in the segment register 32 to generate an address which is further decoded (for example, by a paging address scheme) before the actual physical memory location is accessed.

The addressed location is used as a source or a destination (or for indirect addressing, a location where data can be sourced or destined). The source or destination data is associated with a given GP register 34 for that particular instruction. As noted earlier, the renaming of the GP register would apply to the GP register 34 when instructions are executed. The present invention applies to the renaming of the segment register 32, so that additional segment registers 32 can be provided in addition to those registers provided by the instruction set architecture.

The present invention is implemented and described in respect to a particular embodiment in which segment registers are renamed. Furthermore, the segment registers in the example are data segment registers (that is, those registers used to store segments for addressing data). It is appreciated that other embodiments are available and those other embodiments can include code segment or stack segment registers. These other embodiments will allow for the renaming of the segment registers in other ways without departing from the spirit and scope of the present invention.

In reference to the Intel Architecture, there are four data segment registers. These data segments are referred to as DS, ES, FS and GS data registers and are so illustrated in FIG. 3. The present invention applies to instructions which use or modify one of the segment registers and in the preferred embodiment, pertains to instructions which refer to one of the data registers DS–GS.

The four data segment registers are referenced as architectural segment registers 40 in FIG. 3, since these are the logical registers specified by the instruction set. With the prior art, these data segment registers had one-to-one relationship with physical registers. However, the present invention allows for the data segment registers to be mapped into additional physical data segment registers. The renaming (or remapping) is performed in the segment register alias table (SRAT) 41. The renamed physical registers are shown as segment registers 42 in FIG. 3.

In the particular example, each of the logical registers 40 is mapped to have a dedicated shadow register which serves as the dedicated rename space. The internal physical registers 42 are named xS0 or xS1 for each of the corresponding xS registers 40 (x being one of A–D). That is, DS can be mapped into either DS0 or DS1. Thus, for a selected logical data segment register 40, there is a corresponding architectural register for holding (or storing) the segment information relating to the architectural segment and a shadow register for holding the segment information relating to the speculative segment (in this respect, the shadow register is the speculative register). It is a function of the SRAT 41 to maintain track as to which of the pair of registers 42 has the architectural value and which has the speculative value.

It is appreciated that a particular segment register can be mapped into one of two dedicated registers only. Unlike the GP register remapping, this simpler technique allows for a less complicated implementation of register remapping. The functional description is provided below utilizing the DS register as an example. The same operations would apply to ES, FS and GS alike.

Figure 5:
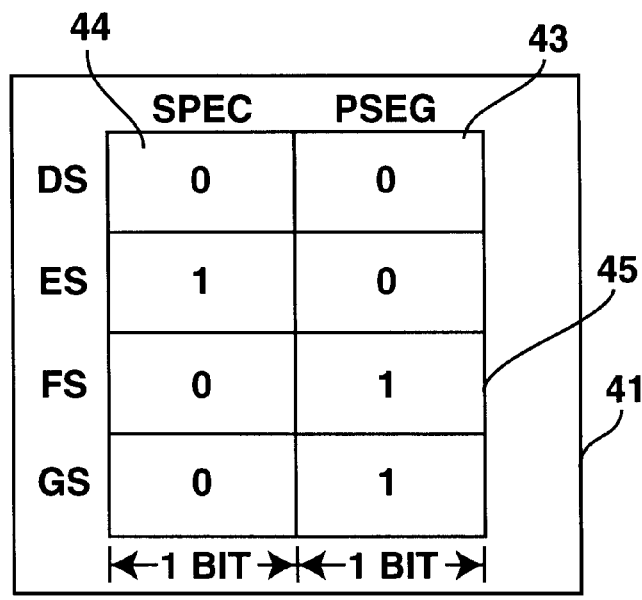
FIG. 5 shows a bit array field for a SPEC bit and a PSEG bit in a segment register alias table used in the practice of the preferred embodiment.

The DS0 and DS1 registers are designed to have an address designation noted by a difference of one bit. For example, if register DS had a physical segment encoding of 011, a remapped DS0 would have an address encoding designation of 0011, while DS1 may have an address encoding of 1011. A fourth bit is appended in the most-significant-bit position to identify either the DS0 or the DS1 register to the original encoding. This is done for each pair of registers 42. That is, in the preferred embodiment, a fourth bit is appended to a segment identifier of three bits to provide a physical segment (PSEG) identifier. The difference bit (the most significant bit in the example) is identified as a PSEG bit in the SRAT 41. Thus, for each logical segment register 40, there is a PSEG value associated with it and the MSB of the PSEG value is stored in the SRAT 41 as the PSEG bit for each segment register. An example bit pattern is illustrated in FIG. 5. Likewise, for each segment register 40, there is a corresponding speculative (SPEC) bit associated with it. The SPEC bit identifies if the register identified by the PSEG bit is speculative. The PSEG and SPEC bits for each pair of registers are stored as a two-bit field in an array 45.

The operation of the SRAT 41 is described in the following example. The SPEC and PSEG bits are shown having the bit pattern in the array 45 shown in FIG. 5. The PSEG bit 43 and the SPEC bit 44 correspond to register DS and each has a value of "0" in the example. The "0" value of the SPEC bit 44 indicates that the segment operation in this instance has been committed (not speculative) and the "0" value of the PSEG bit identifies that the current segment register is DS0. Thus, DS0 has the architectural (or committed) value.

When the next instruction that updates DS is executed, SPEC bit 44 and the PSEG bit 43 are accessed. Since the SPEC bit has a value of 0 (indicating that it is non-speculative), both the SPEC bit and the PSEG bit are flipped. In the example, bit 43 and bit 44 would now have a value of 1. The PSEG bit 43 value of 1 indicates that the identified register is DS1 and the SPEC bit 44 value of 1 indicates that DS1 is speculative. Thus, this access requiring a write to the DS register results in a write to the renamed DS1 register and its status is speculative. Once this operation is retired and is no longer speculative, the SPEC bit 44 is cleared, so that it again has a value of zero. However, DS1 will now have the architectural value. The next DS modifying instruction would then flip both bits again so that the SPEC bit 44 would have a value of 1 and the PSEG bit 43 would have a value of 0. Thus, DS0 and DS1 alternate as the speculative register. If and when one of the DS0 or DS1 register is speculative, the other is architectural.

In the event another DS instruction attempts an access to modify the contents of the DS register while a speculative condition exists, the SPEC bit 44 will have a value of 1. Reading the 1 value will indicate that both DS0 and DS1 are being utilized (one architectural and one speculative), so no write to modify these registers will be permitted, at least not until the SPEC bit 44 is cleared to 0. This ensures that the contents of DS0 and DS1 are not corrupted, if both are being used. Essentially, if one of the DS0 or DS1 registers is available for a modifying operation, then a write to the open register is permitted. If both are being utilized, then the contents of these registers will not be modified until one is released. The value of the SPEC bit identifies if only one or both registers are currently being used.

It is to be noted that the operative sequence noted above for changing the PSEG and SPEC bit values pertains to modifying operations on the segment registers. That is, the operations pertain to writes which change contents of the segment registers. When the segment registers are used, the contents of the DS0 or DS1 register is read. An example of such use of segment registers is the execution of load/store instructions which load information from memory or store information to memory. In that event, the appropriate one of the DS0 or DS1 register is read to obtain the segment value for the load/store operation. The current register is identified by the current value of the PSEG register.

Aside from the simplicity of using two bits to control the renaming of segment registers, the two bit array arrangement also simplifies the restoring of the registers if a fault, branch misprediction event or other terminating condition occurs. In that instance, the array 45 is restored to the last architectural state by exclusively OR'ing (XOR) the corresponding SPEC and PSEG bits to obtain the architectural PSEG state and then resetting all of the SPEC bits to 0. This XOR operation causes the PSEG bit to be flipped to the architectural value if the state was originally speculative (that is, the SPEC bit was a 1). Then, combining this bit value to the three segment encoding bits that do not change, allows the array 45 to be restored to the previous architectural state.

Figure 6:
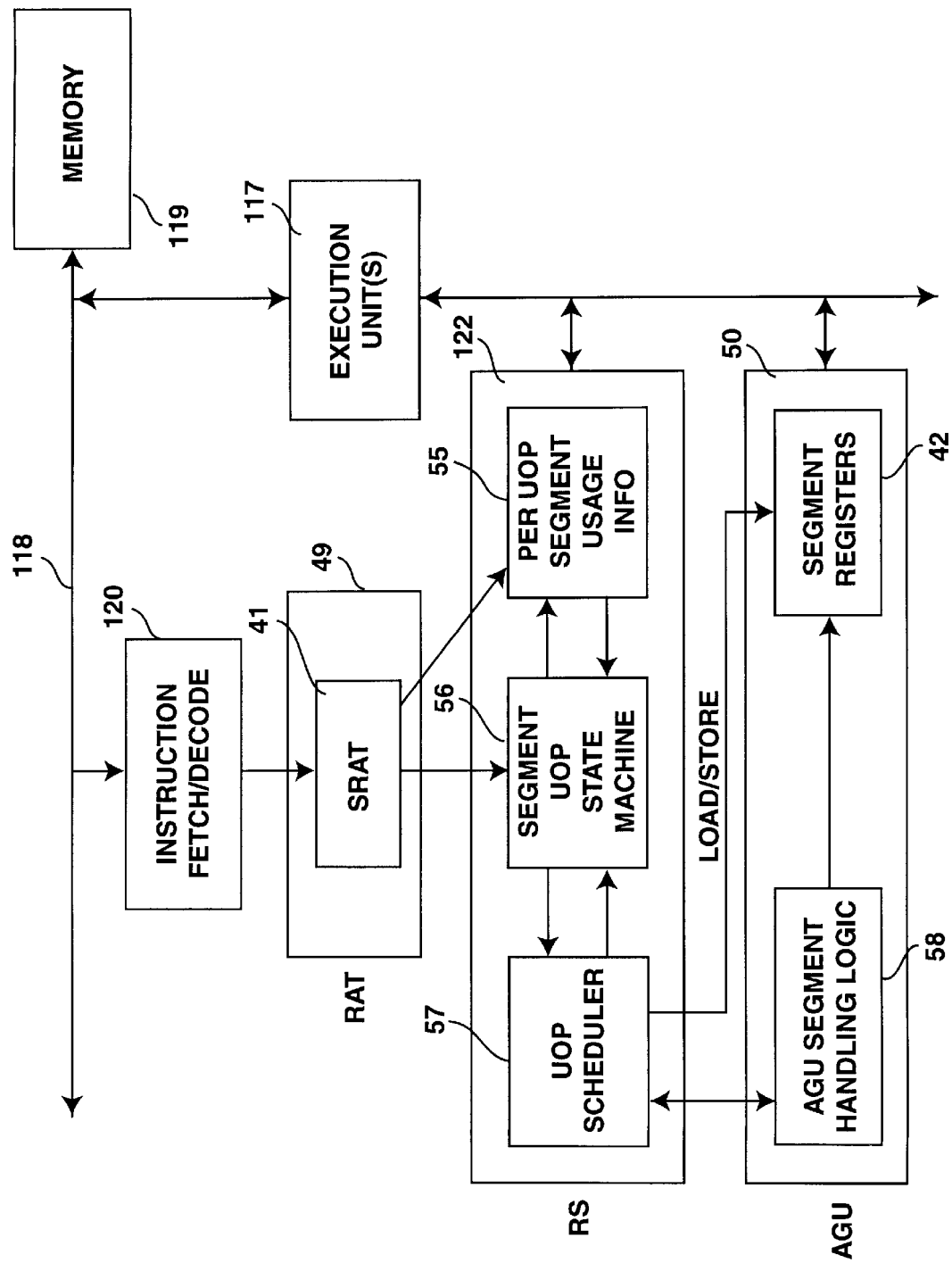
FIG. 6 shows a block diagram of a portion of a processor implementing the segment register renaming technique of the present invention.

FIG. 6 is a block diagram illustrating an example inclusion of the present invention into a processor. It is also to be noted that the present invention can be readily included into the processor of FIG. 2, where GP register renaming is implemented. In the illustration, fetch/decoder unit 120, bus 118, memory 119 reservation station (RS) 122 and execution unit(s) 117, function equivalently to respective units 20, 18, 19, 22 and 17 of FIG. 2, except that now additional microcode and hardware are also present to execute the present invention.

Figure 7:
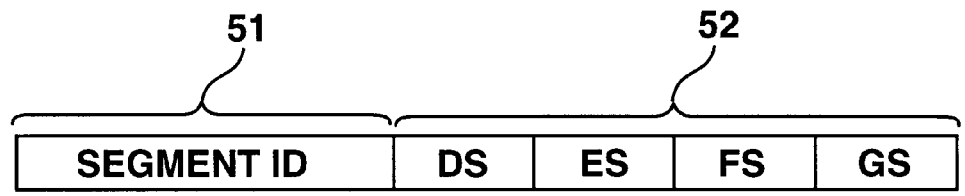
FIG. 7 shows a format of a segment control signal generated by the segment register alias table to identify and control those load/store dependencies based on a renamed segment.

The decoder 120 receives an instruction and generates the appropriate uop to a RAT 49. The RAT 49 includes the SRAT 41 and can include the GP RAT 11 as well. The PSEG and SPEC bits of the SRAT 41 are sent to the RS 122. The RAT 49 sends with each uop a field 52 called a Segment_Dependency. The Segment_Dependency field 52 is associated with a physical segment identifier (segment ID) 51 as illustrated in FIG. 7. The segment ID 51 is comprised of the PSEG identifier, which was earlier discussed. The Segment_Dependency field 52 is comprised of four bits, one each for DS–GS. For each uop, the PSEG encoding identifies the renamed segment. The corresponding bit in the Segment_Dependency field 52 is set and indicates which segment is being used. The other three Segment_Dependency bits are set to 0. This information is provided as a "per uop segment usage information" entry to a segment usage unit 55 in the RS 122.

The RAT 49 also sends a Segment_PreventSchedule vector 53 to a segment uop state machine 56 within the RS 122. The Segment_PreventSchedule vector has a similar 4-bit format as the Segment_Dependency field 52 of FIG. 7, but is issued only when the segment rename uop is initiated. The bit corresponding to the segment register being updated is set to 1. The state machine 56 also receives the Segment_Dependency field from the segment usage unit 55 so that all uops referencing this particular segment are prevented from being dispatched until the segment information is updated. The state machine issues a Segment_Schedule vector to a uop schedular 57, which is used to schedule and dispatch the load/store uops to the AGU 50.

The schedular 57 operates to schedule the various uops, as well as the timing of the loading and the storing of the physical segment registers 42. At the appropriate time when the information in the segment registers are valid, the schedular 57 issues a Segment_AllowVector to clear the state machine 56. The uops which were prevented from being dispatched earlier due to the Segment_PreventSchedule vector are now permitted to be executed. The AGU 50 includes the segment registers 42 as well as the necessary logic circuitry 58 for performing the load/store operations of the registers 42 in response to signals from the schedular 57.

Accordingly, the RS 122 honors all of the segment dependencies between the uop which issues the rename and the load and/or store uop which follow(s) it. The RS 122 ensures that the segment dependencies of the load/store uops by disabling their scheduling until the execution of the rename uop by the AGU 50.

Figure 8:
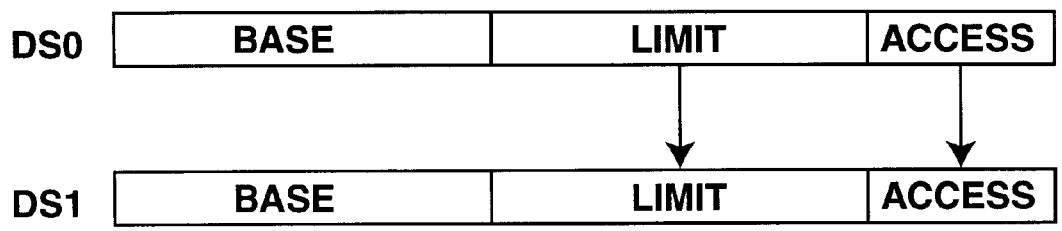
FIG. 8 shows the transfer of limit and access information to a shadow register when the processor is operating under real mode.

FIG. 8 shows a feature of the present invention, which is utilized to account for processors of the Intel Architecture operating in the "real mode." When in the real mode, the limit and access fields for a given segment are not modified when segment is updated. This is because the base component is predetermined and the limit and access values do not change. Accordingly, in the preferred embodiment, the access and limit fields of a segment register (such as DS0) are copied to the access and limit fields of its shadowing register (DS1 in this example), whenever a rename sequence is initiated, when operating in the real mode. However, in actual practice, this copying is done with all modes of operation. In the real mode the access and limit information are utilized. In any other mode, the copied fields are written over when the new segment information is written into the register.

It is appreciated that the renaming of the segment registers can be implemented in a number of ways. One particular technique is shown in the microcode instructions shown below:

```
tmpa  := load_descriptor_cond (GDT, selector),
         write_selector (SEG_SINK);
tmpb  := load_descriptor_cond (LDT, selector),
         write_selector (SEG_SINK);
tmpd  := write_selector_limit_AR (DS, selector, 0);
tmpc  := select (tmpa, tmpb);
tmpa  := upper32bits (tmpc, tmpd);
sink  := build_rename_segment (DS, tmpa, tmpc),
         if_pass (DATA_CHECK);
```

The microcode instructions utilize a number of temporary registers for executing the instructions. The first two instructions load the descriptors to tmpa and tmpb by using the selector. Here two instructions are used to handle conditional loads. The tmpd instruction is the trigger to the rename sequence of events, so that this uop causes the selector to be sent to the rename segment, as well as checking the SPEC bit and flipping the PSEG bit. The next instruction selects either tmpa or tmpb followed by a splitting of the 64 bits into two 32-bit portions. The sink operation completes the rename operation and indicates to the RS that the segment register has been renamed. It also performs the various access checks as well.

Thus, it is appreciated that the renaming of the segment register allows for instructions using or modifying the segment registers to be executed in a non-serialization sequence of program events. This allows superscalar operations to be performed on instructions associated with the segment register, which speeds the processing time and efficiency. As noted earlier in the Background section, processors based on 32-bits or higher, can now run 16-bit code with improved efficiency.

It is appreciated that there are a number of alternative embodiments available when putting the present invention into practice. For example, the renaming technique can be implemented by the use of more than the one shadow register described above for the preferred embodiment. It is possible to employ more registers. For example, if four segment rename registers are used, the PSEG bit can be increased to two bits to reference the four registers. An incremental counter or a grey-code counter can be used to cycle through the registers. However, this will necessarily increase the complexity of the required circuitry.

It should also be noted that the register mapping approach know in the prior art could be used for the segment registers. However, results have shown that this unlimited remapping approach results in only a marginal boost over the technique of the present invention, but the added complexity of the unlimited approach adds significant cost in terms of needed circuitry and area on the chip. Since the segment registers are not modified extensively (as are the GP registers), the present invention provides a simpler approach to enhance performance of the processor when segment register renaming is desired.

Thus, a technique for renaming segment registers is described.

We claim:

1. In a processor which receives an instruction to use or modify a logical segment register used for addressing, an apparatus for remapping the logical segment register into more than one physical segment registers comprising:

a plurality of physical segment registers;

a decoder for receiving and decoding said instruction which specifies said logical segment register for use with said instruction, said decoder for generating micro-operations for executing said instruction by utilizing one of said physical segment registers, but remapping the logical segment register to another physical segment register if the one physical segment register is being utilized by another instruction specifying the same logical segment register;

a rename table coupled to said decoder and having a bit array resident therein, said bit array having a first bit field to identify which one of said physical segment registers is selected for remapping of said logical segment register;

said micro-operations for assigning said selected physical segment register as a renamed segment register for use with said instruction, said rename table also coupled to said physical segment registers.

2. The apparatus of claim 1 wherein said physical segment registers are dedicated to function as physical segment registers for a particular logical segment register.

3. The apparatus of claim 2 further including a state machine coupled to said rename table and said physical segment registers for preventing execution of micro-operations pertaining to said logical segment register until said logical segment register is remapped.

4. The apparatus of claim 3 wherein said bit array remaps each logical segment register provided for in a processor instruction set.

5. In a processor which receives an instruction to use or modify a logical segment register used for addressing, an apparatus for remapping the logical segment register into one of two physical segment registers comprising:

a first physical segment register;

a second physical segment register;

a decoder for receiving and decoding said instruction which specifies said logical segment register for use with said instruction, said decoder for generating micro-operations for executing said instruction, but causing said logical segment register to be remapped to either said first or second physical segment register which is not being utilized by another instruction;

a rename table coupled to said decoder and having a bit array therein, said bit array having a physical segment (PSEG) bit, wherein a value of said PSEG bit identifies which one of said two physical segment registers was last utilized, said bit array also having a speculative (SPEC) bit to identify if said last utilized physical segment register pertains to a speculative operation;

said micro-operation causing said SPEC bit to be checked for its value and if no speculative operations are pending, indicating that the other of said physical segment register is not in use, said PSEG bit is changed to select the other of said physical segment register as a renamed segment register for use by said instruction, at which time said SPEC bit is set to a value indicating that said renamed segment register is not available for use by a subsequent instruction specifying said logical segment register.

6. The apparatus of claim 5 further including a state machine coupled to said rename table and said physical segment registers for preventing execution of micro-operations pertaining to said logical segment register until said logical segment register is remapped to said renamed segment register.

7. The apparatus of claim 6 wherein said SPEC bit is placed in a cleared state when the use of said logical segment register is no longer speculative.

8. The apparatus of claim 7 wherein said rename table includes a bit array of PSEG and SPEC bits for remapping each logical segment register provided for in a processor instruction set.

9. A computer system for remapping a logical segment register of an instruction into more than one physical segment registers comprising:

a memory;

a processor coupled to said memory for executing instructions which use or modify logical segment registers for addressing locations to access said memory, said processor including:

a) a plurality of physical segment registers;

b) a decoder for receiving and decoding said instruction which specifies said logical segment register for use with said instruction, said decoder for generating micro-operations for executing said instruction, but causing said logical segment register to be remapped to one of said physical segment registers which is not being utilized by another instruction;

c) a rename table coupled to said decoder and having a bit array therein, said bit array having a physical segment (PSEG) bit field, wherein a value of said PSEG bit field identifies which one of said physical segment registers associated with said logical segment register was last utilized, said bit array also having a speculative (SPEC) bit field to identify if a speculative operation is pending;

d) said micro-operation causing said SPEC bit field to be checked for its value and if one of said physical segment registers is not in use, said PSEG bit field is changed to select an available physical segment register as a renamed segment register for use by said instruction, at which time said SPEC bit field is set to a value indicating that said renamed segment register is not available for use by a subsequent instruction.

10. The computer system of claim 9 further including a state machine coupled to said rename table and said physical segment registers for preventing execution of micro-operations pertaining to said logical segment register until said logical segment register is remapped to said renamed segment register.

11. The computer system of claim 10 wherein said SPEC bit field is placed in a cleared state when the use of said logical segment register is no longer speculative.

12. The computer system of claim 11 wherein said rename table includes a bit array of PSEG and SPEC bits for remapping each logical segment register provided for in a processor instruction set.

13. A method of remapping a logical segment register into a plurality of physical segment registers, comprising the steps of:

decoding an instruction which specifies said logical segment register;

generating micro-operations for executing said instruction, wherein said micro-operations cause a renaming of said logical segment register to allocate a physical segment register not being utilized by another instruction;

accessing a rename table having a bit array therein, said bit array having a first bit field to identify which one of said physical segment registers was last utilized, said bit array also having a second bit field to identify if one of said physical segment registers is not being utilized by another instruction;

checking said second bit field for its value to determine if one of said physical segment registers is available, and if available;

remapping said logical segment register to the available physical segment register.

14. The method of claim 13 further including the step of preventing execution of micro-operations pertaining to said logical segment register until said logical segment register is remapped.

15. The method of claim 14 further including the step of clearing said second bit field when the use of said physical segment register by said instruction is no longer speculative.

16. The method of claim 15 further including the step of assigning dedicated physical segment registers for renaming of each logical segment register.

17. In a processor which receives an instruction to use or modify a logical segment register used for addressing, a method of remapping the logical segment register into a pair of physical segment registers, comprising the steps of:

decoding an instruction which specifies said logical segment register;

generating micro-operations for executing said instruction, wherein said micro-operations cause a renaming of said logical segment register to allocate a physical segment register not being utilized by another instruction;

accessing a rename table having a bit array therein, said bit array having a physical segment (PSEG) bit, wherein a value of said PSEG bit identifies which one of said pair of physical segment registers was last utilized, said bit array also having a speculative (SPEC) bit to identify if said last utilized physical segment register pertains to a speculative operation;

checking said SPEC bit to determine if a speculative operation is pending and if no speculative operations is pending, changing said PSEG bit to select the other of said physical segment register as a renamed segment register for said instruction;

setting said SPEC bit to a value indicating that said selected physical segment register is not available for use by a subsequent instruction specifying said logical segment register.

18. The method of claim 17 further including the step of preventing execution of micro-operations pertaining to said logical segment register until said logical segment register is remapped.

19. The method of claim 18 further including the step of clearing said SPEC bit when said logical segment register is no longer speculative.

20. The method of claim 19 further including the step of assigning PSEG and SPEC bits for each logical segment register provided for in a processor instruction set.

* * * * *